United States Patent
Faust

(10) Patent No.: US 7,789,779 B2
(45) Date of Patent: Sep. 7, 2010

(54) CONTINUOUSLY VARIABLE TRANSMISSION

(75) Inventor: Hartmut Faust, Bühl (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 655 days.

(21) Appl. No.: 11/707,558

(22) Filed: Feb. 17, 2007

(65) Prior Publication Data

US 2007/0298917 A1      Dec. 27, 2007

Related U.S. Application Data

(63) Continuation of application No. PCT/DE2005/001413, filed on Aug. 11, 2005.

(30) Foreign Application Priority Data

Aug. 19, 2004  (DE)  .................. 10 2004 040 204
Aug. 11, 2005  (WO) ............... PCT/DE2005/001413

(51) Int. Cl.
  F16H 59/00    (2006.01)
  F16H 61/00    (2006.01)
  F16H 63/00    (2006.01)
  F16H 55/56    (2006.01)
  F16H 57/04    (2006.01)

(52) U.S. Cl. .............................. 474/18; 474/28; 474/45

(58) Field of Classification Search ..................... 474/8, 474/12, 18, 28, 43, 45
  See application file for complete search history.

(56) References Cited

U.S. PATENT DOCUMENTS

| | | | | | |
|---|---|---|---|---|---|
| 1,541,007 A | * | 6/1925 | Thiemer | ......................... | 464/16 |
| 1,715,077 A | * | 5/1929 | Tenney et al. | .................. | 74/343 |
| 1,963,355 A | * | 6/1934 | Davis | ........................... | 219/50 |
| 1,973,702 A | * | 9/1934 | Cooke | .......................... | 464/16 |
| 1,982,284 A | * | 11/1934 | Briner | .......................... | 416/160 |
| 2,451,447 A | * | 10/1948 | Ransome | ........................ | 409/8 |
| 2,927,510 A | * | 3/1960 | Wildhaber | ..................... | 409/12 |
| 2,996,131 A | * | 8/1961 | Greenwood | .................. | 175/293 |
| 3,063,266 A | * | 11/1962 | Rabson | ......................... | 464/174 |
| 3,141,313 A | * | 7/1964 | Brickett et al. | ................. | 464/97 |
| 3,242,695 A | * | 3/1966 | Ross, Jr. | ....................... | 464/16 |
| 3,359,803 A | * | 12/1967 | Long | ............................ | 74/650 |
| 4,504,246 A | * | 3/1985 | Mott | .............................. | 474/8 |
| 4,578,049 A | * | 3/1986 | Sakai | ............................. | 474/8 |
| 4,588,389 A | * | 5/1986 | Sakai | ........................... | 474/43 |

(Continued)

FOREIGN PATENT DOCUMENTS

DE        199 21 750 A1    11/1999

(Continued)

*Primary Examiner*—John Q Nguyen
*Assistant Examiner*—Henry Liu
(74) *Attorney, Agent, or Firm*—Alfred J. Mangels

(57) ABSTRACT

A belt-driven conical-pulley transmission having a shaft on the input end and a shaft on the power output end. One of the shafts includes at least one axial bore extending in the longitudinal direction of the shaft, and a transverse bore extending from the axial bore to an outlet on the surface of the shaft. A conical disk pair is carried on the shaft and includes an axially fixed disk and an axially movable disk. The axially movable disk includes internal teeth that engage with external teeth on the shaft, and it overlies the transverse bore outlet over its entire axial travel distance. The transverse bore outlet is positioned in the region of the interengaging teeth.

10 Claims, 6 Drawing Sheets

U.S. PATENT DOCUMENTS

| | | | |
|---|---|---|---|
| 4,813,914 A * | 3/1989 | Mott | 474/8 |
| 4,961,669 A * | 10/1990 | Itoh et al. | 403/359.6 |
| 5,064,040 A * | 11/1991 | Johnson | 192/85 AA |
| 5,184,981 A * | 2/1993 | Wittke | 474/19 |
| 5,439,419 A * | 8/1995 | Yamada et al. | 474/18 |
| 5,603,670 A * | 2/1997 | Mozer | 474/43 |
| 5,607,371 A * | 3/1997 | Yamaguchi | 475/210 |
| 5,645,366 A * | 7/1997 | Ishibashi et al. | 403/359.5 |
| 5,766,105 A * | 6/1998 | Fellows et al. | 474/18 |
| 5,772,520 A * | 6/1998 | Nicholas et al. | 464/162 |
| 5,776,022 A * | 7/1998 | Schellekens | 474/18 |
| 5,830,071 A * | 11/1998 | Castellon | 464/162 |
| 5,919,094 A * | 7/1999 | Yaegashi | 464/162 |
| 5,941,787 A * | 8/1999 | Imaida et al. | 474/18 |
| 6,012,998 A * | 1/2000 | Schutz et al. | 474/43 |
| 6,089,999 A * | 7/2000 | Imaida et al. | 474/18 |
| 6,123,634 A * | 9/2000 | Faust et al. | 474/8 |
| 6,336,878 B1 * | 1/2002 | Ehrlich et al. | 474/28 |
| 6,506,136 B2 * | 1/2003 | Schmid et al. | 474/18 |
| 6,589,126 B1 * | 7/2003 | Muller et al. | 474/12 |
| 6,648,781 B1 * | 11/2003 | Fischer et al. | 474/8 |
| 6,840,876 B2 * | 1/2005 | Illerhaus et al. | 474/28 |
| 6,871,719 B2 * | 3/2005 | Breese et al. | 180/248 |
| 6,949,854 B1 * | 9/2005 | Schlicht | 310/103 |
| 6,997,834 B2 * | 2/2006 | Vorndran et al. | 474/28 |
| 7,131,921 B2 * | 11/2006 | Walter et al. | 474/8 |
| 2001/0031678 A1 * | 10/2001 | Schmid et al. | 474/18 |
| 2004/0258338 A1 | 12/2004 | Glas | 384/535 |
| 2007/0149299 A1 * | 6/2007 | Azuma et al. | 464/179 |

FOREIGN PATENT DOCUMENTS

| | | |
|---|---|---|
| DE | 100 37 136 A1 | 3/2001 |
| DE | 10 2004 015 A1 | 10/2004 |

* cited by examiner

US 7,789,779 B2

CONTINUOUSLY VARIABLE TRANSMISSION

CROSS-REFERENCE TO RELATED APPLICATION

This application is a continuation of International Application Serial No. PCT/DE2005/001413, with an international filing date of Aug. 11, 2005, and designating the United States, the entire contents of which is hereby incorporated by reference to the same extent as if fully rewritten.

BACKGROUND OF THE INVENTION

1. Field of the Invention

The present invention relates to an automatic transmission in the form of a belt-driven conical-pulley transmission, as it is known from, for example, DE 10 2004 015 215 and other publications, as well as to a method for manufacturing it, and to a vehicle equipped with it.

2. Description of the Related Art

In a broader sense, automatic transmissions are essentially modulating converters that stepwise or steplessly independently change the present transmission ratio as a function of current or expected operating conditions, such as partial load, thrust, and ambient parameters such as temperature, air pressure, and humidity. Included in that group are modulating converters that are based on electric, pneumatic, hydrodynamic, or hydrostatic principles, or a combination of those principles.

The automation relates to a diverse array of functions such as, for example, starting, transmission ratio selection, and type of transmission ratio change at various operation conditions, wherein the type of transmission ratio change can be understood as, for example, the shifting from one gear to another, the skipping of gears, and the speed of the shift.

The desire for comfort, reliability, and commercially acceptable manufacturing complexity and cost determines the degree of automation, in other words, how many functions run independently.

As a rule, the driver can manually engage the automatic process or restrict it to individual functions.

Automatic transmissions in a stricter sense, as they are used today especially in vehicle construction, generally have the following design:

Located on the input side of the transmission is a starting unit in the form of a controllable clutch, for example a wet or dry friction clutch, a hydrodynamic clutch, or a hydrodynamic converter.

A lockup clutch is frequently attached to a hydrodynamic converter in parallel to the pump and turbine portion, which increases efficiency through direct power transmission and dampens vibrations at critical rotational speeds through defined slippage.

The starting unit drives a mechanical, stepless or stepwise adjustable speed change transmission that can contain a forward-/reverse driving unit, a main-, range-, split group, and/or a variable speed drive unit. Gear groups are designed, according to requirements for smoothness of operation, space conditions, and transmission options, as reduction gearing or planetary arrangements with straight or diagonal teeth.

The output element of the mechanical transmission, a shaft or a gear, directly or indirectly drives a differential, via intermediate shafts or an intermediate step with a constant transmission ratio, which differential can be designed either as a separate transmission or as an integral component of the automatic transmission. In principle, the transmission is best suited for longitudinal or transverse installation in a motor vehicle.

Hydrostatic, pneumatic and/or electrical actuators are provided for adjusting the transmission ratio in the mechanical transmission. A hydraulic pump based on the principle of displacement delivers pressurized oil to the starting unit, in particular the hydrodynamic unit, for the hydrostatic actuators of the mechanical transmission and for the lubrication and cooling of the system. Gear pumps, screw type pumps, vane pumps, and piston pumps, with the latter mostly being of radial design, are used according to required pressure and displacement volume. In practice, gear pumps and radial piston pumps have proven themselves for that purpose, wherein the advantage of the gear pumps is that they are easy to manufacture, while the advantage of the radial piston pumps is their higher pressure level and their superior controllability.

The hydraulic pump can be provided at any desired site on the transmission on a main or an auxiliary shaft that is constantly driven by the drive unit.

Continuous automatic transmissions are known that include a drive unit, a planetary reverse gear as a forward-/reverse driving unit, a hydraulic pump, a variable speed drive unit, an intermediate shaft and a differential. The variable speed drive unit in turn includes two conical disk pairs and an endless torque-transmitting means. Each conical disk pair includes a second, axially displaceable conical disk. Running between that conical disk pair is the endless torque-transmitting means, for example a thrust link belt, a tension chain, or a belt. When the second conical disk is adjusted, the running radius of the endless torque-transmitting means changes, thereby causing the transmission ratio of the continuously adjustable automatic transmission also to change.

Continuously adjustable automatic transmissions require a high level of pressure to be able to adjust the conical disks of the variable speed drive unit at the desired speed at all points of operation, and also to transmit the torque with sufficient baseline contact pressure virtually without any wear.

One of the objects of the invention is to improve power transmission facilitated by a hydraulic medium. Another object of the invention is to simplify the manufacturing of parts and thereby favorably influence manufacturing costs. Another object of the invention is to increase the operational integrity of components and thus extend the life of an automatic transmission of that type. A further object of the invention is to increase the torque transmitting capacity of that type of transmission or to facilitate the transmission of greater power through the components of the transmission.

SUMMARY OF THE INVENTION

Those objects are achieved by the present invention and its embodiments outlined in the claims and illustrated in the description and related drawings, in particular through a belt-driven conical-pulley transmission with conical disk pairs on the input side as well as on the output side. Each of the conical disk pairs includes a fixed disk and a displaceable disk, each of which, in turn, can be disposed on an input side shaft and on an output side shaft, and can be connected with a belt means for the purpose of transmitting torque. At least one of the shafts has at least one bore extending in the longitudinal direction of the shaft, emanating from which is at least one bore, such as an inclined or a transverse bore extending to the outer surface of the shaft, the exit of which is arranged at a region of the outer surface that is overlapped by the displaceable disk, regardless of its axial position.

That results in a shortening of the supply bore for the hydraulic medium, which can therefore be produced more economically and with increased process reliability.

In general, it can be advantageous in a belt-driven conical-pulley transmission in accordance with the present invention if at least one fixed disk is integrally formed with the shaft.

It can also be advantageous if the displaceable disk is non-rotatably connected to the shaft yet is axially displaceable via a tooth arrangement.

It can be especially advantageous if the exit of the bore at the outer surface is provided in the area of the teeth.

By providing the bore in the middle of the toothed connection, a form of corrugations around the highly stressed bore outlet is formed, thereby making a considerable increase in durability feasible, since the stress in the critical region around the bore outlet at the outer surface of the shaft between the teeth is considerably reduced.

It can prove to be advantageous if the tooth is eliminated at the region of the bore outlet, while it can also be advantageous to eliminate two teeth adjacent to the bore outlet along the inner diameter of the displaceable disk.

In general, it can be advantageous in the case of a belt-driven conical-pulley transmission in accordance with the invention to provide multiple bore outlets around the circumference, wherein the bore outlets can preferably be arranged equally around the circumference.

In a belt-driven conical-pulley transmission in accordance with the invention, the displaceable disk and the fixed disk of a conical disk pair are preferably arranged associated with one another in the circumferential direction.

It can also be advantageous if in the region of the inner teeth of the displaceable disk a ridge is provided that engages at the site of the eliminated tooth of the shaft, and/or if in the region of the outer diameter of the shaft at least one ridge is provided that lies in the region of the eliminated tooth of the displaceable disk, thereby allowing incorrect assembly to be constructively excluded.

The invention also relates to a method for manufacturing a belt-driven conical-pulley transmission in accordance with the invention, wherein the tool for producing the outer teeth of the shaft and/or the inner teeth of the displaceable disk—as seen in the circumferential direction—produces only a portion of the profile and is angularly rotated to produce a further portion.

The invention further relates to a vehicle with a transmission in accordance with the invention.

BRIEF DESCRIPTION OF THE DRAWINGS

The invention is explained in further detail below with reference being made to the attached drawings.

Shown are.

DESCRIPTION OF THE PREFERRED EMBODIMENTS

Figure 1:
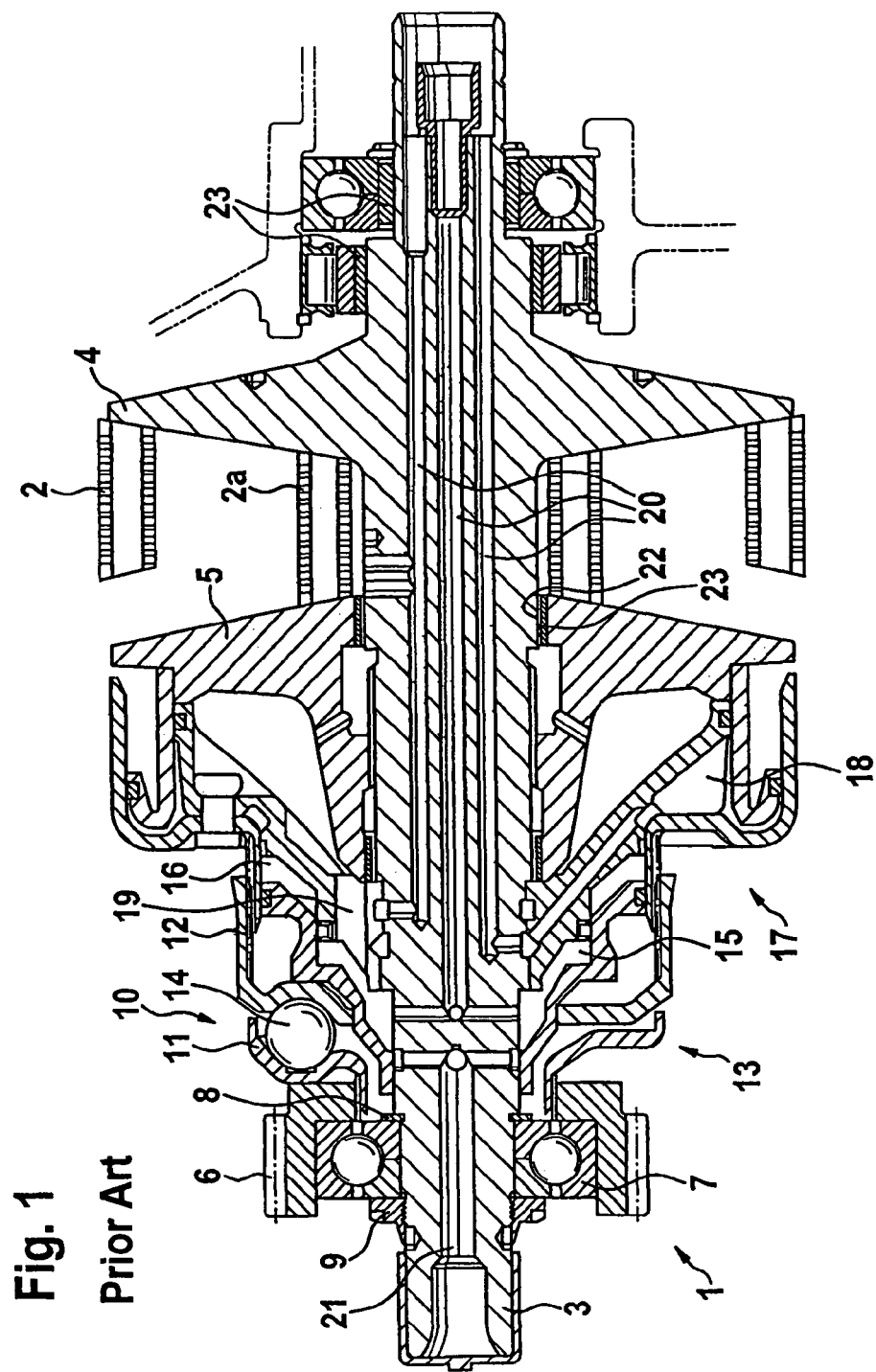
FIG. 1 a longitudinal cross-sectional view of portion of a known belt-driven conical-pulley transmission, FIG. 2 a cross-sectional view corresponding essentially to FIG. 1 of an embodiment of the present invention, FIG. 3 a fragmentary cross-sectional view taken along the line III-III of FIG. 2, FIG. 4 an enlarged detail of portion IV in FIG. 3, FIG. 5 an enlarged detail of portion V in FIG. 3, FIG. 6 a cross-sectional view of other possible embodiments taken along the line III-III of FIG. 2.

FIG. 1 shows only a portion of a belt-driven conical-pulley transmission, namely the input- or output-side portion of the belt-driven conical-pulley transmission 1 driven by a drive engine, such as an internal combustion engine, for example. In a fully assembled belt-driven conical-pulley transmission, associated with that input-side portion is a complementary output-side portion of the continuously adjustable belt-driven conical-pulley transmission, wherein both portions are connected by an endless torque-transmitting means in the form, for example, of a plate-link chain 2 for the transmission of torque. On its input side, the belt-driven conical-pulley transmission 1 includes a shaft 3, which in the illustrated embodiment is integrally formed with a fixed conical disk or fixed disk 4. Along the axial longitudinal direction of the shaft 3, the axially fixed conical disk 4 is located directly opposite an axially displaceable conical disk or axially movable disk 5.

In FIG. 1, the plate-link chain 2 on the input-side conical disk pair 4, 5 is shown as being in a radially outer position, which results in the axially displaceable conical disk 5 in the drawing being displaced to the right. That displacement movement of the axially displaceable conical disk 5 brings about a movement of the plate-link chain 2 toward a radially outer position, thereby facilitating a transmission ratio change to high speed in the transmission.

The axially displaceable conical disk 5 can also be displaced to the left in the drawing plane, using a known method, causing the plate-link chain 2 to assume a radially inner position (which is labeled 2*a* in the drawing), thereby bringing about a transmission ratio change to slow speed in the belt-driven conical-pulley transmission 1.

The torque generated by a drive engine (not shown) is transmitted to the input-side portion of the belt-driven conical-pulley transmission shown in FIG. 1 via a gear 6 mounted on the shaft 3, which gear is mounted on the shaft 3 via a roller bearing in the form of an axial and radial force-absorbing ball bearing 7, which is secured to the shaft 3 via a washer 8 and a shaft nut 9. Arranged between the gear 6 and the axially displaceable conical disk 5 is a torque sensor 10, with which a spreader disk configuration 13 with an axially fixed spreader disk 11 and an axially displaceable spreader disk 12 is associated. Arranged between the two spreader disks 11, 12 are rolling bodies, shown in that example in the form of balls 14.

A torque transmitted via the gear 6 results in an angle of rotation between the axially fixed spreader disk 11 and the axially displaceable spreader disk 12, which brings about an axial displacement of the spreader disk 12, namely owing to the run-up ramp arranged thereon, along which the balls run and thus provide an axial offsetting of the spreader disks relative to one another.

The torque sensor 10 has two pressure chambers 15, 16, wherein the first pressure chamber 15 is filled with a volume of pressure medium based on the level of torque transmitted, and the second pressure chamber 16 is supplied with a volume of pressure medium based on the gear transmission ratio of the transmission.

For generating the contact pressure with which the plate-link chain 2 between the axially fixed conical disk 4 and the axially displaceable conical disk 5 is acted upon with a normal force, a piston/cylinder unit 17 is provided, having two pressure chambers 18, 19. The first pressure chamber 18 serves the transmission-ratio-dependent change in the action upon the plate-link chain 2, and the second pressure chamber 19 serves, in conjunction with the torque-controlled pressure chamber 15 of the torque sensor 10, for increasing or decreasing the pressure with which the plate-link chain 2 between the conical disks 4, 5 is acted upon.

To supply the pressure chambers with pressure medium, the shaft 3 includes three channels 20 through which the pressure medium is fed into the pressure chambers by a pump (not shown). The pressure medium can flow out of the shaft 3 through a channel 21 on the outlet side and be recirculated.

The action upon the pressure chambers 15, 16, 18, 19 leads to a torque- and transmission-ratio dependent shifting of the axially displaceable conical disk 5 on the shaft 3. For mounting the displaceable conical disk 5, the shaft has centering surfaces 22, which serve as a sliding seat for the displaceable conical disk 5.

As FIG. 1 makes it easy to see, the belt-driven conical-pulley transmission has a noise damping device 23 at the bearing sites of the conical disk 5 on the shaft 3. The noise damping device can be provided with an annular body and a damping insert, or it can consist only of a damping insert.

Figure 2:
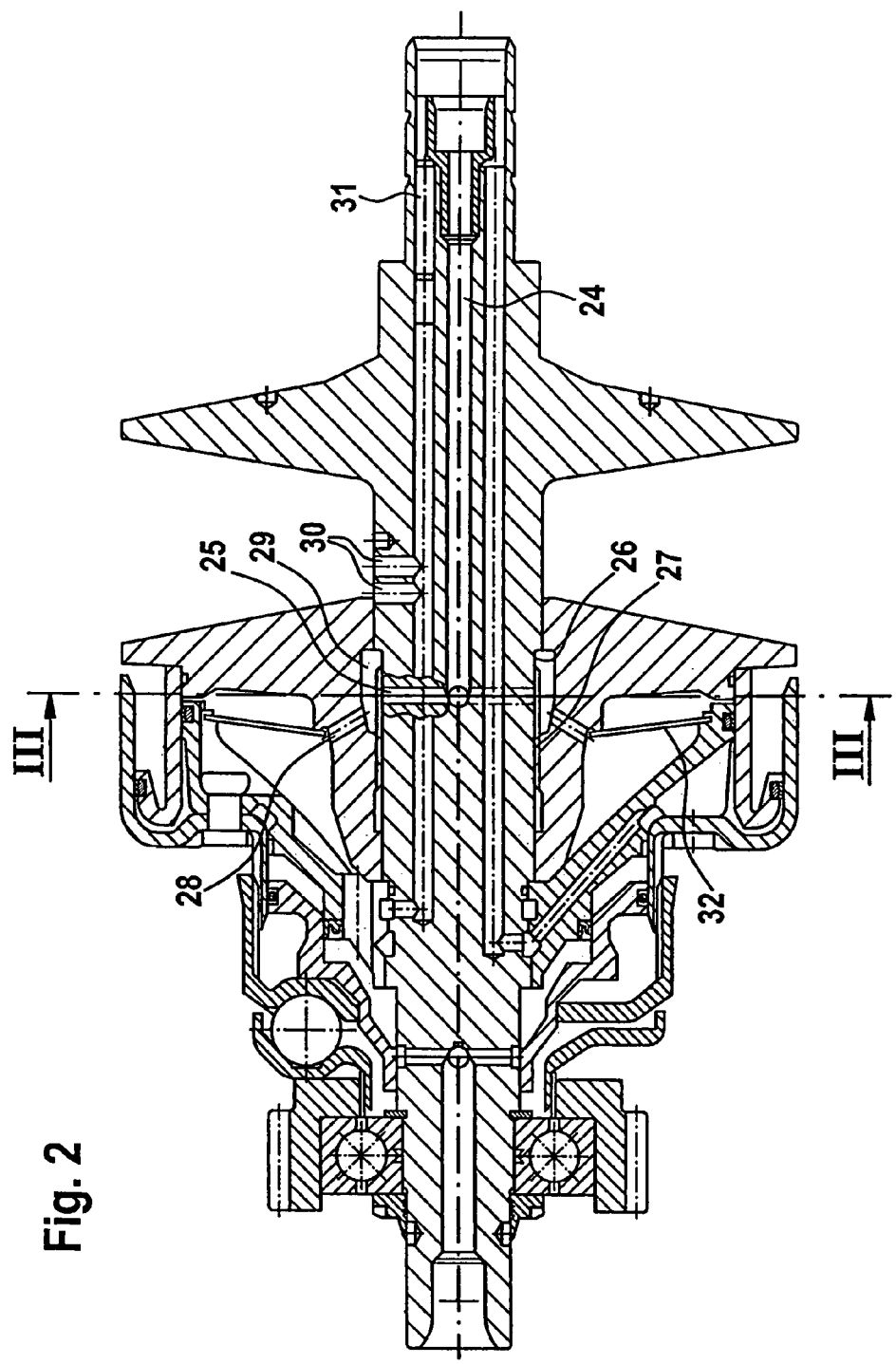

The reference numbers used in FIG. 1 also refer to the essentially comparable features in FIG. 2. To that extent, the figures can thus be viewed as a unit. For the sake of clarity, FIG. 2 only uses the reference numbers that continue where those of FIG. 1 ended.

In FIG. 2, the middle of the three channels 20 is designed in accordance with the invention. It is clear that the bore 24 forming the central channel 20, which is manufactured as a blind bore shown on the right side in FIGS. 1 and 2, is clearly shorter in the FIG. 2 embodiment than it is shown in FIG. 1. Blind bores of that type are difficult to produce and require a high degree of precision. The manufacturing difficulty and the requirements for process reliability increase disproportionately with length. Shortening a bore of that type thus has a favorable effect on manufacturing costs.

Branching off at the base of bore 24 is the transverse bore 25, of which a plurality can be provided around the circumference of shaft 3. In the embodiment shown, that transverse bore 25 is shown as a radial bore. However, it can also be produced at another angle as an inclined bore. The bore 25 penetrates the outer surface of the shaft 3 at a location that is always overlapped by the displaceable disk 5, regardless of operating condition, such as the selected transmission ratio, for example.

By placing the transverse bore 25 in the overlap region of the displaceable disk 5, the shaft 3 can be shortened axially, thereby saving space. Shortening the shaft 3 also brings about a reduction in stress.

The opening of the channel or transverse bore 25 can be arranged in the region of the recess 26, for example, which adjoins the centering surface 22 of the shaft. That can be particularly advantageous if the teeth 27, which facilitate the non-rotatable but axially displaceable mounting of the displaceable disk 5 to the shaft 3, is placed under heavy stress by the transmission of torque, for example.

In many cases, however, the stress placed on the teeth 27 does not become the critical design criterion, so that the opening of the transverse bore 25 can be placed in the region of the teeth, as is shown in FIG. 2. Arranging the transverse bore 25 at the teeth 27 instead of at the recess 26 results in the advantage that a greater resistance moment is present, whereby the bending stress in the surface layer zone is decreased. In addition, the surface moment of inertia is greater at that location, while the critical layer, which is disrupted by the transverse bore 25, remains at a somewhat constant radius. As a result, the stress in the critical region around the opening of the transverse bore 25 between the teeth of the tooth arrangement 27 is clearly decreased.

The hydraulic fluid supply is identical in FIGS. 1 and 2, because the pressure chambers 15 and 19 are connected to one another and the displaceable disk 5 has connecting bores 28 that connect the region of the teeth 27 to the pressure chamber 19. In the figures, the displaceable disk 5 is shown in its extreme left position, which corresponds to the starting transmission ratio or underdrive. If the displaceable disk 5 is then displaced to the right in the direction of the fixed disk 4, then a portion of the hollow space or the chamber 29 will always be above the opening of the transverse bore or channel 25, so that the required fluid supply is always ensured, just as it is in FIG. 1.

Also as in FIG. 1, there are two switching states for the pressure chamber 16, which are a function of the axial position of the displaceable disk 5. In the position illustrated, the control bores 30 are opened, so that the channel 20, connected thereto and axially closed with a stopper 31, and the pressure chamber 16, connected to it by a channel, which is not shown, are free of pressure or only have ambient pressure. If the displaceable disk 5 is moved toward the fixed disk 4, it slides over the control bores 30, whereby the chamber 29 comes to rest over the openings of the control bores 30 starting at a certain position of displaceable disk 5. Prevailing in the chamber 29, however, is a high pressure as a function of torque, which is conducted into the pressure chamber 16 via the control bores 30 and the channel 20, so that high pressure is present there as well. In that way, two switching states are realized that control the contact pressure as a function of the transmission ratio.

Furthermore, a disk spring 32 is provided in FIG. 2, which in the pressure-free state of the transmission 1 brings the displaceable disk 5 into a predetermined axial position, whereby a transmission ratio of the transmission 1 can be set that prevents excessive stress in a particular situation, such as when towing the vehicle, for example.

Figure 3:
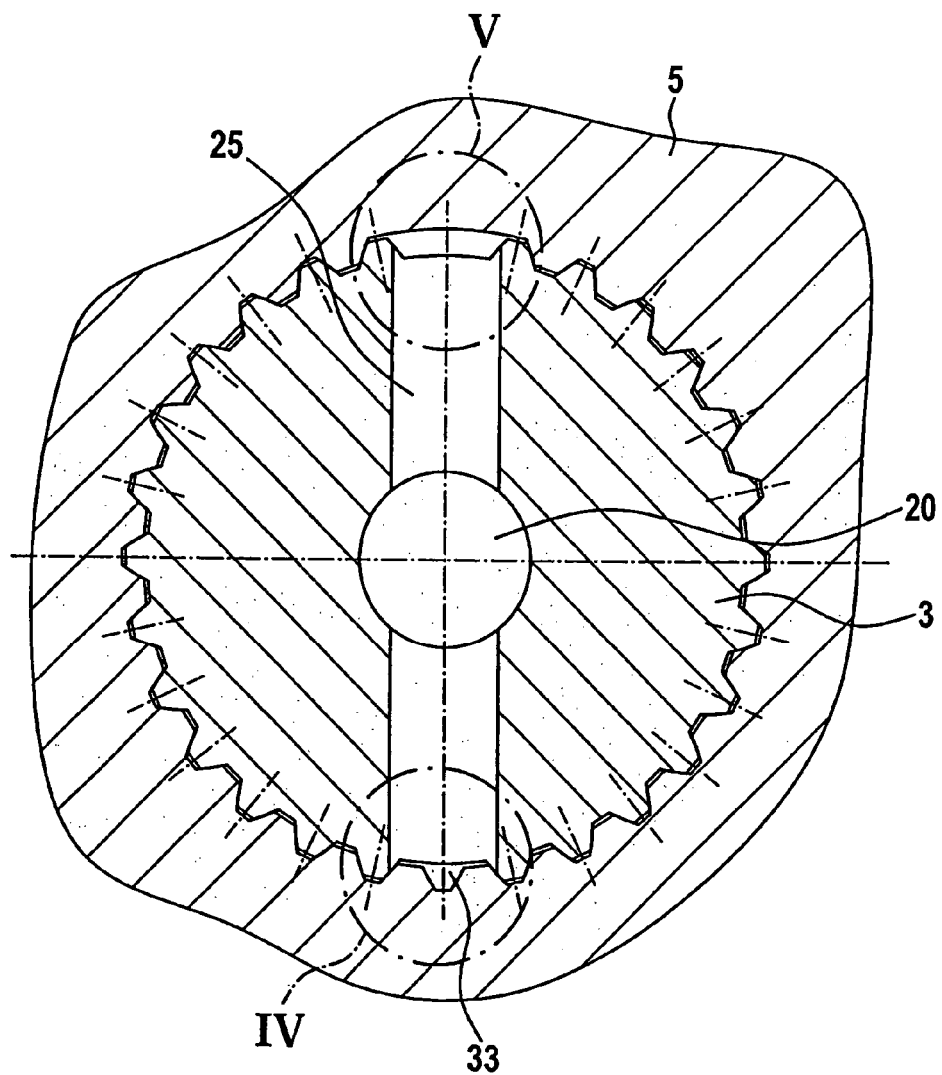

FIG. 3 shows an enlarged fragmentary cross-section as viewed along the line III-III in FIG. 2, wherein the upper and lower halves of the figure each illustrate a different embodiment of the transverse bore or channel 25.

Figure 4:
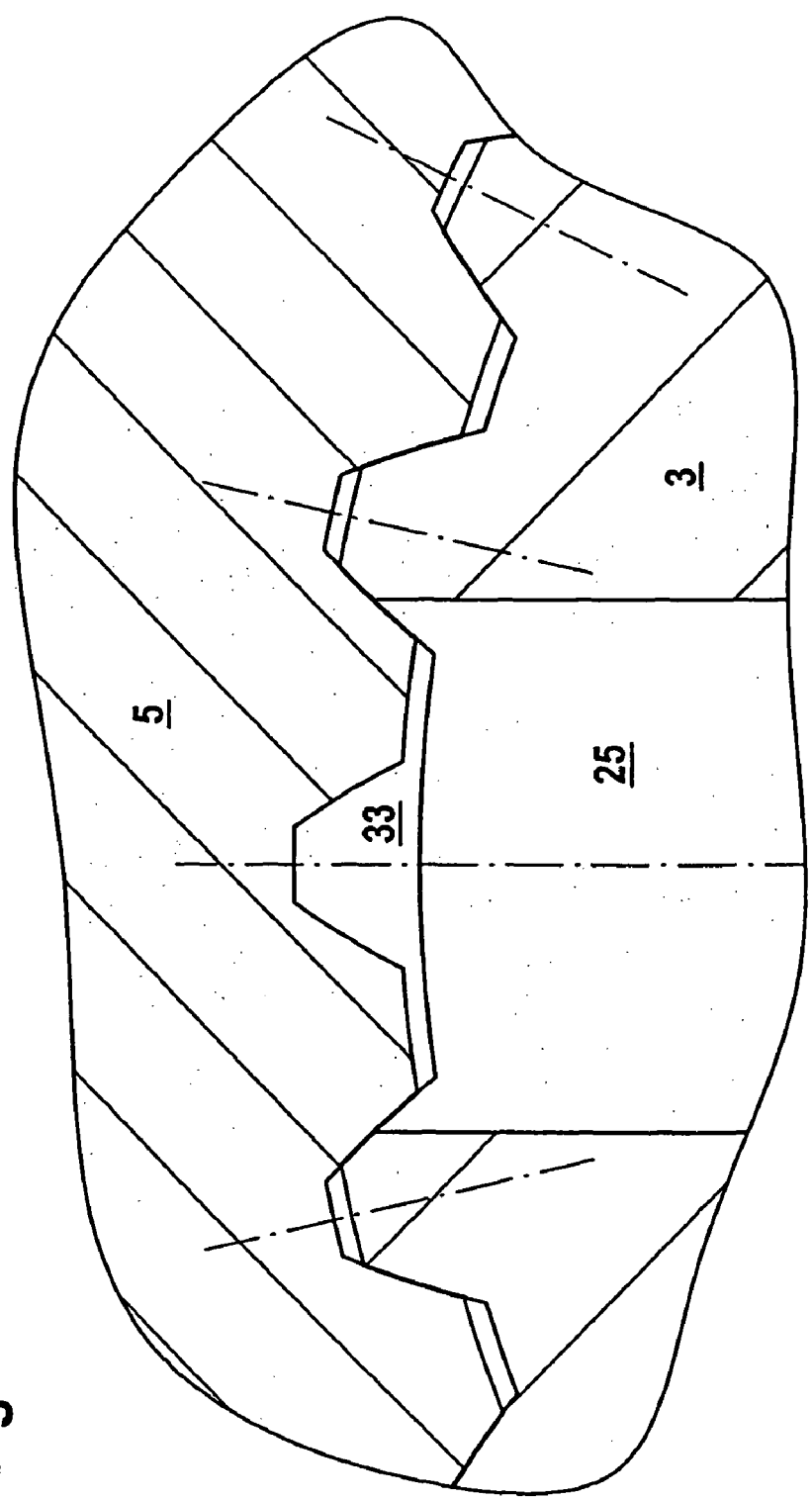

In the lower region IV, which is shown enlarged in FIG. 4, the tooth that would be present where the channel 25 opens into the casing surface of the shaft 3 is eliminated or not included at all, thereby forming—when the shaft is viewed axially—a channel 33 through which hydraulic fluid can flow.

Figure 5:
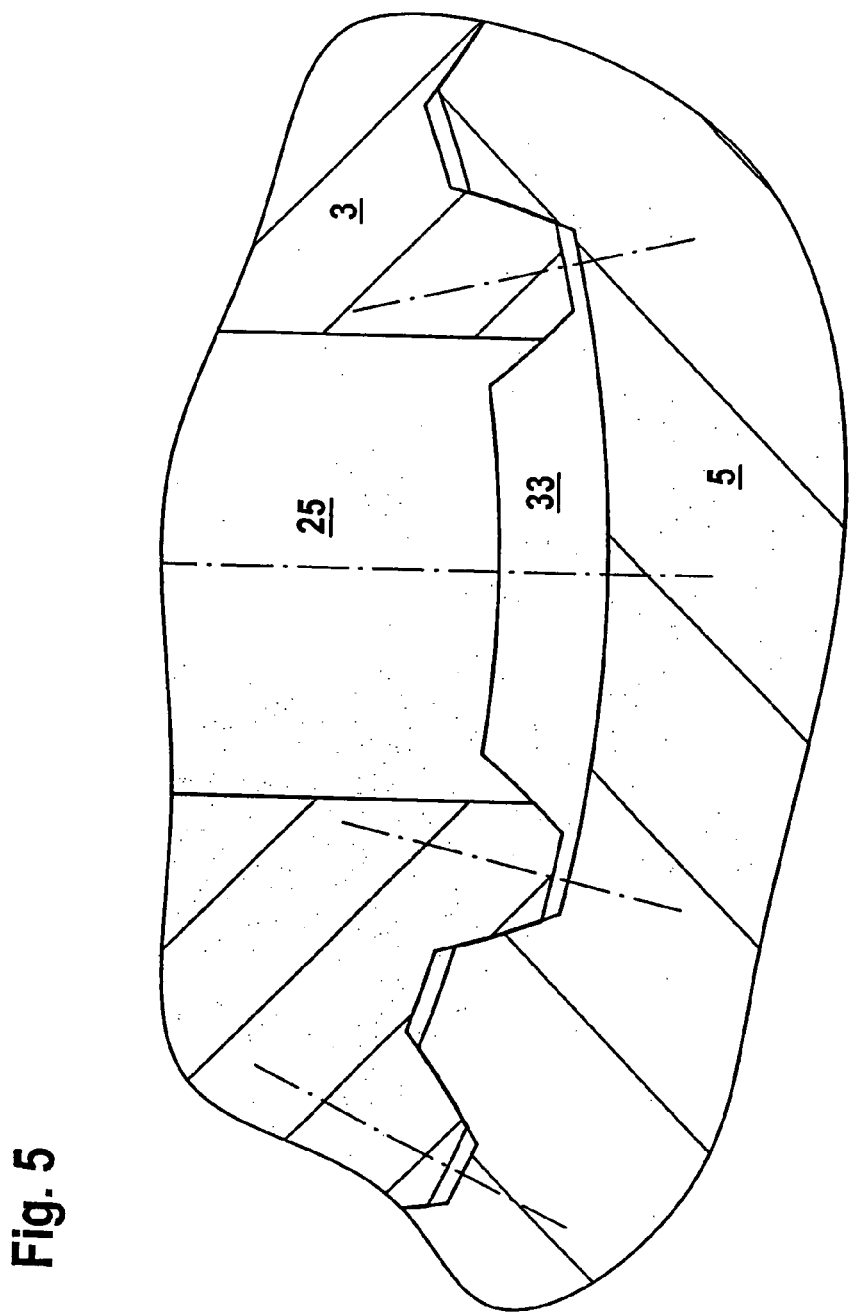

If that form of cross section of the channel 33 is not sufficient, the two adjacent teeth of the displaceable disk 5 projecting radially inwardly can be removed, as is shown in region V and in enlarged form in FIG. 5.

The elimination of up to three teeth per channel 33 can be realized at multiple segments of the circumference to allow the required total flow cross section to be achieved. It is preferable if that is realized, for example, three times around the circumference with even angular distribution, and with a number of teeth evenly divisible by three, for example 30 teeth.

When the displaceable disk 5 is being mounted on the shaft 3, care should be taken to make sure that the displaceable disk 5 is arranged at the correct angular position relative to the fixed disk 4 to ensure the required cross-sectional area of the channel 33.

Figure 6:
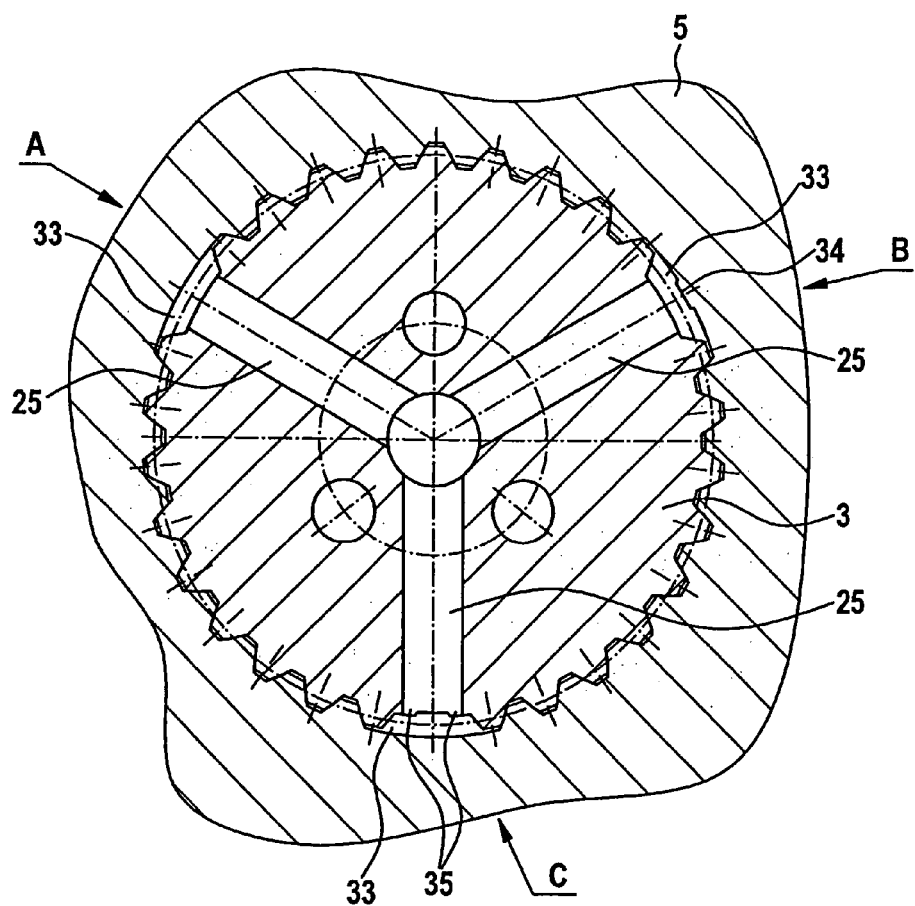

FIG. 6, in turn, shows three different channel configurations, where care must be taken to ensure the correct mounting in the case of configuration A, while improper mounting can be prevented by constructive measures in configurations B and C.

In configuration A, the arrangement shown in FIG. 5 is still present, wherein that embodiment, as already described, can be distributed in multiple segments along the circumference to facilitate the required flow cross-sectional area. The same also applies to the arrangements in configurations B and C.

In configuration B, a constructive solution is shown that excludes improper association during assembly. In accordance with the invention, at the inner teeth of the displaceable disk 5 a ridge 34 is provided precisely at the point between two originally-present inner teeth, at which a tooth of the shaft 3 would lie in the event of improper assembly.

In configuration C, a solution is shown wherein one or two ridges 35 are provided on the shaft 3 in the double notch at the site at which the teeth of the displaceable disk 5 would lie when an improper assembly was attempted.

In accordance with the invention, the design described above can be economically manufactured by having the tool for gear hobbing the inner teeth of the displaceable disk 5 include only 10 teeth in addition to the tool geometry for the two eliminated teeth, and a correspondingly small diameter so that during production the tool rotates like a planetary wheel three times in the bore of the displaceable disk 5 and thereby yields the original 30 teeth minus the design present in three places along the circumference (the number of teeth is only an example).

Corresponding to the example above, the outer tooth arrangement of the shaft 3 is produced using a tool with originally 10, 20, 30, or correspondingly more teeth, including the eliminated teeth. Except for the one-time cost of acquiring the tool, there are practically no additional costs per unit.

The invention can advantageously be used for all CVT disk sets with an oil conduit to the piston/cylinder unit 17 through the displaceable disk 5 in the region of the teeth 27, particularly at high transmission torque.

The invention can also be used at the appropriate site of the output-side conical disk set (not shown).

The invention claimed is:

1. A continuously variable transmission comprising: conical disk pairs on an input side and on an output side of the transmission, each of which pairs includes an axially fixed disk and an axially displaceable disk, one disk pair carried on an input-side shaft and another disk pair carried on an output-side shaft, wherein the axially displaceable disk is non-rotatably connected to its associated shaft and is axially displaceable by a plurality of respective axially-extending, circumferentially-distributed teeth formed on an inner surface of the axially displaceable disk and a plurality of corresponding and interengaging axially-extending circumferentially-distributed teeth on a toothed region of the outer surface of the associated shaft that interengage with the teeth on the axially displaceable disk; an endless torque-transmitting means carried by the disk pairs for transmitting torque between the disk pairs, wherein at least one of the shafts includes at least one axial bore extending in the longitudinal direction of the shaft, from which at least one transverse bore extends from the at least one axial bore to an outlet at an outer surface of the at least one shaft, wherein the outlet is located on the shaft outer surface at the toothed region of the shaft and at a position on the shaft outer surface that is always overlapped by the axially displaceable disk over a full range of axial displacement of the axially displaceable disk; and wherein a single axially-extending tooth of the shaft is eliminated at the transverse bore outlet to provide a flow channel for communication with a pressurized-hydraulic-fluid chamber for axially shifting the axially movable disk along the shaft.

2. A continuously variable transmission in accordance with claim 1, wherein at least one axially fixed disk is integrally formed with its associated shaft.

3. A continuously variable transmission in accordance with claim 1, wherein a plurality of transverse bores are provided around a circumference of the shaft and include respective transverse bore outlets at the shaft outer surface to provide respective flow channels for communication with a pressurized-hydraulic-fluid chamber for axially shifting the axially movable disk along the shaft.

4. A continuously variable transmission in accordance with claim 3, wherein the transverse bore outlets are evenly distributed around the circumference of the shaft.

5. A continuously variable transmission in accordance with claim 1, wherein the axially displaceable disk and the axially fixed disk of a conical disk pair are arranged axially offset from one another.

6. A continuously variable transmission in accordance with claim 1, wherein a radially-inwardly-extending ridge is provided on the axially displaceable disk at the circumferential position of the eliminated tooth of the shaft, and wherein the ridge has a shorter radial extent than do adjacent inwardly-extending teeth carried by the axially displaceable disk.

7. A method for producing a continuously variable transmission in accordance with claim 1, including the steps of providing a first tool for forming circumferentially-distributed outwardly-radially-extending axial outer teeth on a shaft; providing a second tool for forming circumferentially-distributed inwardly-radially-extending axial inner teeth on an axially displaceable disk; and angularly rotating each of the first and second tools to produce a first portion of the respective teeth and thereafter further rotating the respective tool to produce a further portion of the teeth.

8. A continuously variable transmission comprising: conical disk pairs on an input side and on an output side of the transmission, each of which pairs includes an axially fixed disk and an axially displaceable disk, one disk pair carried on an input-side shaft and another disk pair carried on an output-side shaft wherein the axially displaceable disk is non-rotatably connected to its associated shaft and is axially displaceable by a plurality of respective axially-extending, circumferentially-distributed teeth formed on an inner bore of the axially displaceable disk and a plurality of corresponding and interengaging axially-extending circumferentially-distributed teeth on a toothed region of the outer surface of the associated shaft that interengage with the teeth on the axially displaceable disk; an endless torque-transmitting means carried by the disk pairs for transmitting torque between the disk pairs, wherein at least one of the shafts includes at least one axial bore extending in the longitudinal direction of the shaft, from which at least one transverse bore extends from the at least one axial bore to an outlet at an outer surface of the at least one shaft, wherein the outlet is located on the shaft outer surface at the toothed region of the shaft and at a position on the shaft outer surface that is always overlapped by the axially displaceable disk over a full range of axial displacement of the axially displaceable disk, wherein two adjacent teeth on the inner bore of the axially displaceable disk are eliminated at a position overlying the transverse bore outlet to provide a flow channel for communication with a pressurized-hydraulic-fluid chamber for axially shifting the axially movable disk along the shaft.

9. A continuously variable transmission in accordance with claim 8, wherein on the outer surface of the shaft at least one radially-outwardly-extending ridge is provided that lies opposite to an eliminated tooth of the axially displaceable disk, and wherein the at least one ridge has a shorter radial extent than do adjacent outwardly-extending teeth carried by the shaft.

10. A motor vehicle including a transmission in accordance with claim 1.

* * * * *